(12) United States Patent (10) Patent No.: US 12,611,993 B2
Head (45) Date of Patent: Apr. 28, 2026

(54) PICKUP BED RAMP AND RAIL ASSEMBLY

(71) Applicant: System of Systems Engineering Specialists, LLC, Grand Junction, CO (US)

(72) Inventor: Lonney Head, Grand Junction, CO (US)

(73) Assignee: System of Systems Engineering Specialists, LLC, Grand Junction, CO (US)

( * ) Notice: Subject to any disclaimer, the term of this patent is extended or adjusted under 35 U.S.C. 154(b) by 423 days.

(21) Appl. No.: 18/180,108

(22) Filed: Mar. 7, 2023

(65) Prior Publication Data

US 2023/0286443 A1 Sep. 14, 2023

Related U.S. Application Data

(60) Provisional application No. 63/317,181, filed on Mar. 7, 2022.

(51) Int. Cl.
B60R 9/06 (2006.01)
B60P 1/43 (2006.01)
B60P 3/06 (2006.01)

(52) U.S. Cl.
CPC .................................... B60R 9/06 (2013.01); B60P 1/43 (2013.01); B60P 3/06 (2013.01)

(58) Field of Classification Search
CPC .... B60P 1/43; B60P 1/435; B60P 3/06; B60P 3/062; B60P 3/07
See application file for complete search history.

(56) References Cited

U.S. PATENT DOCUMENTS

| | | | | |
|---|---|---|---|---|
| 5,553,762 A * | 9/1996 | Brown | .................... | B60P 1/435 224/558 |
| 7,455,489 B1 * | 11/2008 | Klev | ......................... | B60P 3/42 410/3 |
| 9,017,004 B1 * | 4/2015 | Brown, Jr. | .............. | B60P 1/435 414/537 |
| 10,773,630 B1 * | 9/2020 | Thompson | .............. | B60R 9/042 |
| 2001/0045720 A1 * | 11/2001 | Schlicht | .................... | B60R 3/02 280/166 |
| 2012/0009050 A1 * | 1/2012 | Pepin | ...................... | B60P 1/435 414/813 |
| 2013/0223963 A1 * | 8/2013 | Kramlick | .................. | B60P 3/07 414/537 |
| 2014/0338137 A1 * | 11/2014 | Stokes | ...................... | B60P 1/43 14/71.1 |
| 2016/0059763 A1 * | 3/2016 | Sindoni, Jr. | ............. | B60P 1/431 414/537 |
| 2016/0297343 A1 * | 10/2016 | Pelzer | .................... | B60P 3/122 |

(Continued)

*Primary Examiner* — Kaitlin S Joerger

(74) *Attorney, Agent, or Firm* — Heuton IP Law, LLC

(57) ABSTRACT

Systems and methods for loading and transporting all-terrain vehicles (ATV) and utility terrain vehicles (UTV). In examples, a vehicle, which may include but is not limited to a pickup, car/truck with a flatbed, or other vehicle such as a van having a cargo space, may provide for loading and transporting an ATV or a UTV. A rail assembly may be used to load an ATV/UTV and place the ATV/UTV into the space of the pickup truck bed. In further accordance with examples, the rail assembly may include a plurality of ramps configured to accommodate one or more wheels or tires of the ATV/UTV.

17 Claims, 23 Drawing Sheets

(56)                    References Cited

U.S. PATENT DOCUMENTS

| | | | |
|---|---|---|---|
| 2017/0001550 A1* | 1/2017 | Morgan ................... | B60P 3/07 |
| 2017/0113887 A1* | 4/2017 | Pendleton ................ | B60P 1/43 |
| 2020/0031267 A1* | 1/2020 | Pelzer ..................... | B60P 1/64 |
| 2020/0180494 A1* | 6/2020 | Perotti ..................... | B60P 1/43 |

* cited by examiner

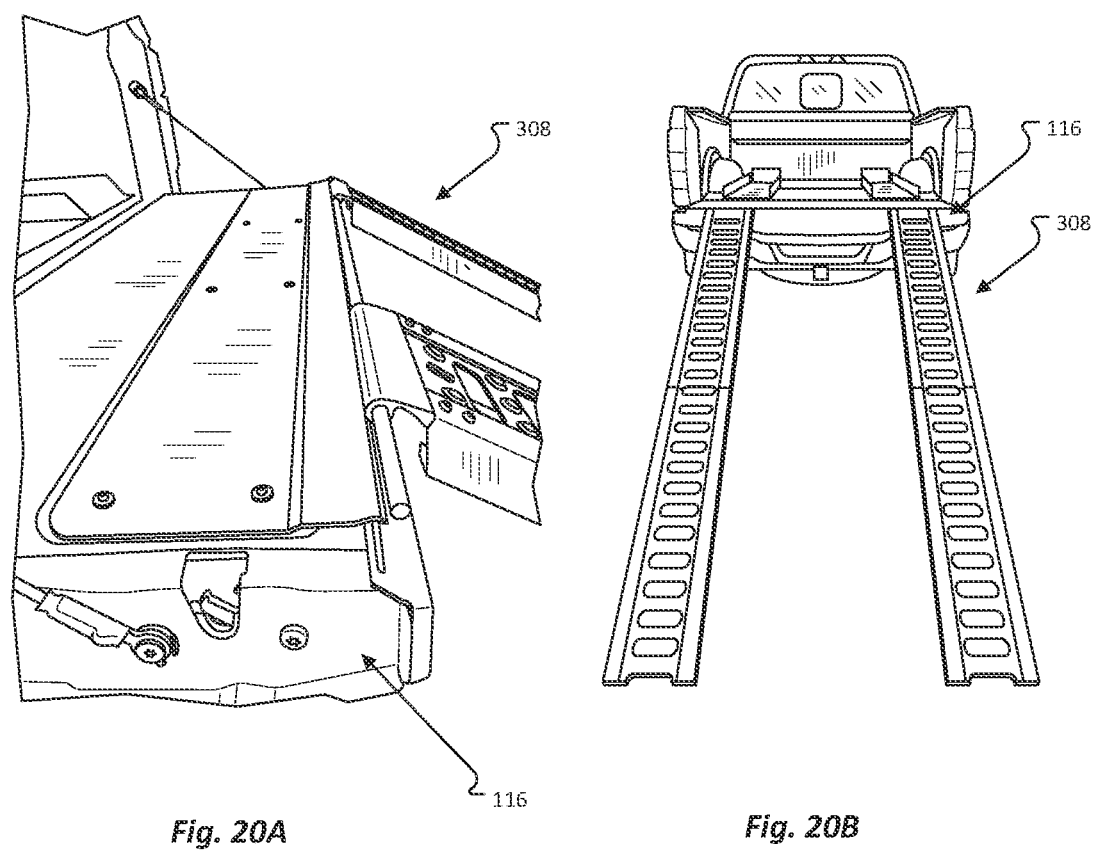
*Fig. 20A*    *Fig. 20B*

100

116

124

308

116

124

PICKUP BED RAMP AND RAIL ASSEMBLY

CROSS REFERENCE TO RELATED APPLICATION

This application claims the priority to U.S. Provisional Application Ser. No. 63/317,181, titled "Pickup Bed Ramp and Rail Assembly," filed Mar. 7, 2022, the disclosure of which is incorporated by reference in its entirety.

BACKGROUND

Outdoor enthusiasts enjoy using all-terrain vehicles (ATV) and utility terrain vehicles (UTV) for off-roading entertainment. The ATV/UTV usually includes four wheels and is smaller than the typical street vehicle and exhibits superior suspension and traction systems permitting the ATV/UTV to be driven on a wider variety of terrain than a normal street vehicle. Although the ATV/UTV is often street-legal; i.e., may be driven on public roads legally, it is typically loaded into a trailer or directly into the bed of pickup truck for transportation via public roads.

Several problems arise when users load an ATV/UTV into a trailer that is towed behind a vehicle. First, trailers can be expensive and require maintenance otherwise, trailers are prone to breaking down. Second, state and local governments typically require registration of trailers at additional costs. Certain systems seeks to overcome the shortcomings of a trailer by having the ATV/UTV loaded directly into or above the load-carrying surface of the vehicle. These prior in-bed transport systems require that the ATV/UTV is disposed above the bed of the vehicle or above the cab of the vehicle. Moreover, prior art in-bed transport systems typically prohibit the use of the trailer hitch of the vehicle when the ATV/UTV is loaded in the vehicle. It would be an improvement over the prior art to provide a bed rail and ramp assembly for loading and transporting ATV/UTVs to overcome the deficiencies of the prior art.

It is to be understood that the following description is only exemplary of the principles of the present invention, and should not be viewed as narrowing the claims which follow.

SUMMARY

Systems and methods for loading and transporting all-terrain vehicles (ATV) and utility terrain vehicles (UTV). In examples, a vehicle, which may include but is not limited to a pickup, car/truck with a flatbed, or other vehicle such as a van having a cargo space, may provide for loading and transporting an ATV or a UTV. A rail assembly may be used to load an ATV/UTV and place the ATV/UTV into the space of the pickup truck bed. In further accordance with examples, the rail assembly may include a plurality of ramps configured to accommodate one or more wheels or tires of the ATV/UTV.

In examples, the rail assembly may, or may not, include a support assembly. The support assembly may, or may not, include an extension support member configured to be coupled to or otherwise received at a towing hitch assembly of the vehicle. In examples, the rail assembly can rest on the pickup truck bed and the support assembly 120 such that an amount of weight placed on a tailgate of the vehicle can be reduced, minimized, and/or eliminated. A receiving hitch assembly may, or may not, receive the extension support member in an area of the bumper.

These and other embodiments of the present invention will become apparent to those skilled in the art from a consideration of the following detailed description taken in combination with the accompanying drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures. Non-limiting and non-exhaustive examples are described with reference to the following Figures.

FIG. 20A includes an exploded side view of the system according to an embodiment of the present disclosure;

FIG. 20B is a rear view of the system according to an embodiment of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
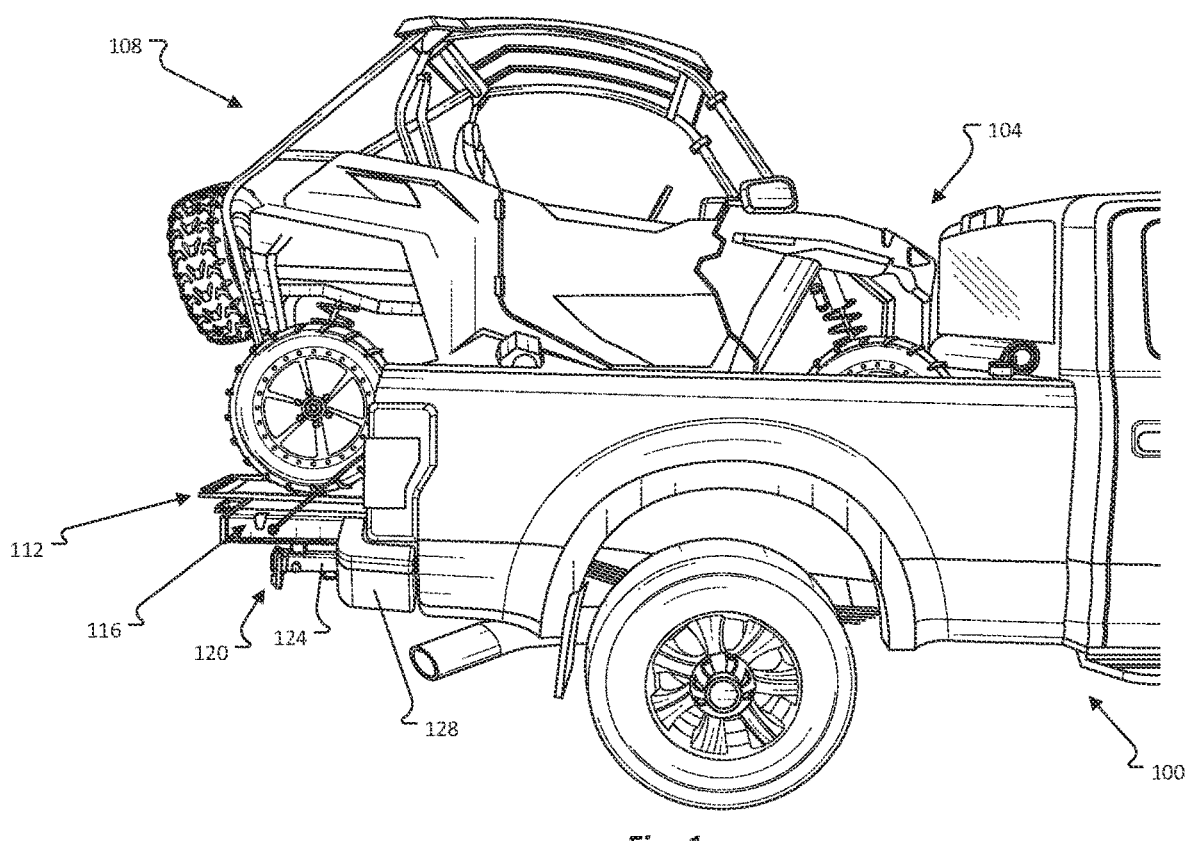
FIG. 1 is a side view of the system according to an embodiment of the present disclosure.

FIG. 1 depicts an example of a pickup bed rail and ramp assembly in accordance with examples of the present disclosure. In examples, a vehicle 100, which may include but is not limited to a pickup, car/truck with a flatbed, or other vehicle such as a van having a cargo space is depicted. In examples, a pickup truck bed 104, may have space for an all-terrain vehicle (ATV) or a utility-terrain vehicle (UTV) 108. In accordance with examples of the present disclosure, a rail assembly 112 may be used to load an ATV/UTV and place the ATV/UTV 108 into the space of the pickup truck bed 104. In accordance with examples of the present disclosure, the rail assembly 112 may include a plurality of ramps configured to accommodate one or more wheels or tires of the ATV/UTV 108. In examples, the rail assembly 112 may include a support assembly 120. The support assembly may include an extension support member 124 configured to be coupled to or otherwise received at a towing hitch assembly of the vehicle 100. In examples, the rail assembly 112 can rest on the pickup truck bed and the support assembly 120 such that an amount of weight placed on a tailgate 116 of the vehicle can be reduced, minimized, and/or eliminated. A receiving hitch assembly as will be further described may receive the extension support member 124 in an area of the bumper 128.

Figure 2:
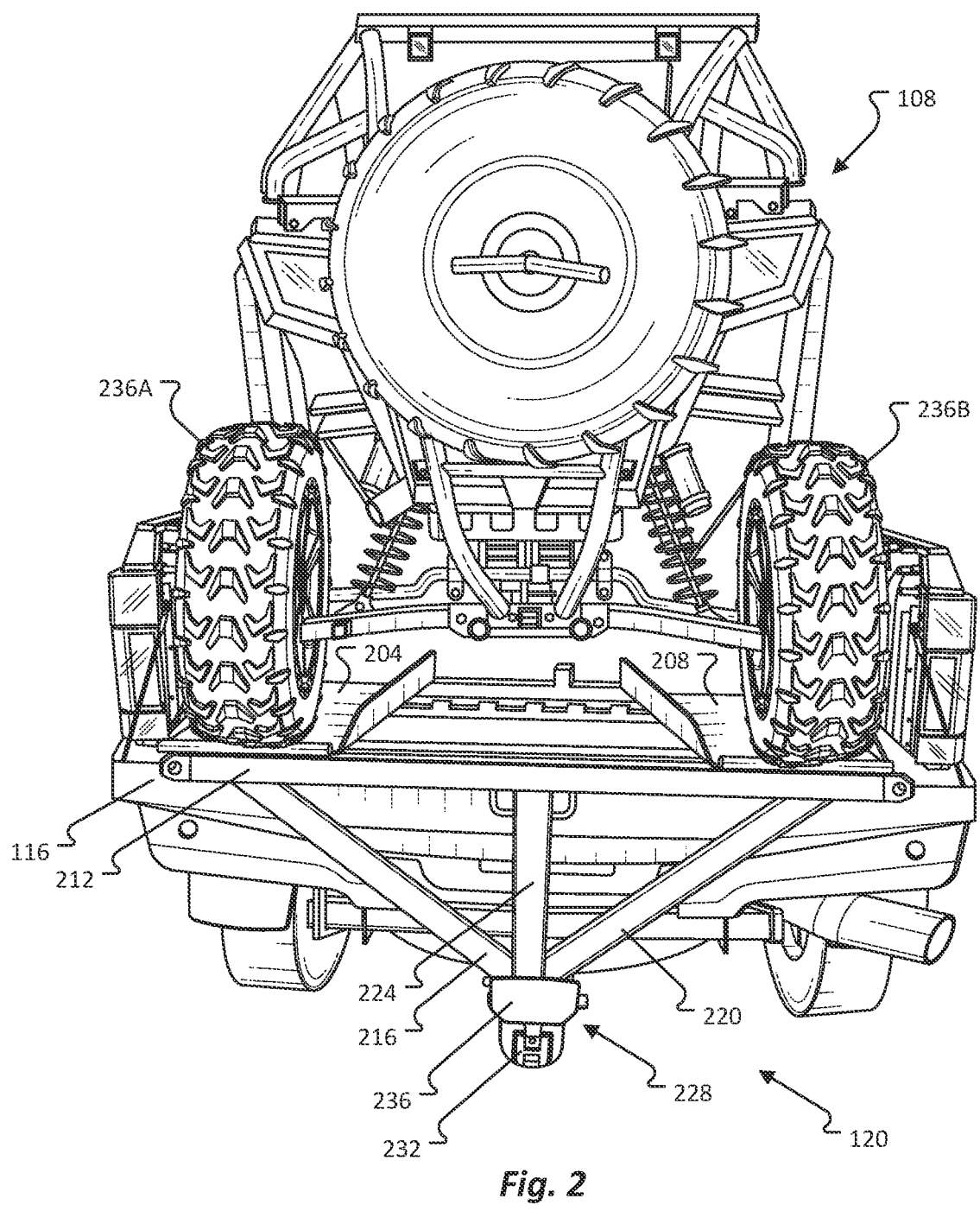
FIG. 2 includes a rear view of the system according to an embodiment of the present disclosure.

FIG. 2 depicts additional details of the rail assembly 112 in accordance with examples of the present disclosure. The rail assembly 112 may include a cross brace bar member 222 coupled to a brace bar member 218. Furthermore, the cross-brace bar member 212 may be coupled to the center brace bar member 224 and the brace bar member 220 in accordance with examples of the present disclosure. Furthermore, the support assembly 120 may include a flip down step assembly 228 removably attached to the extension support member 124. The flip down step assembly 228 may include a step 236 pivotably attached to the extension support member 124. The rail assembly 112 depicted in FIG. 2 may accommodate one or more wheels 236A/236B of the ATV/UTV 108. For example, one or more wheels 236A/236B of the ATV or UTV 108 may contact a respective surface of a rail 204 or 208 of the rail assembly 112. Thus, the wheels 236A and 236B of the ATV/UTV 108, may be guided by the rails 204 and 208 respectively.

Figure 3:
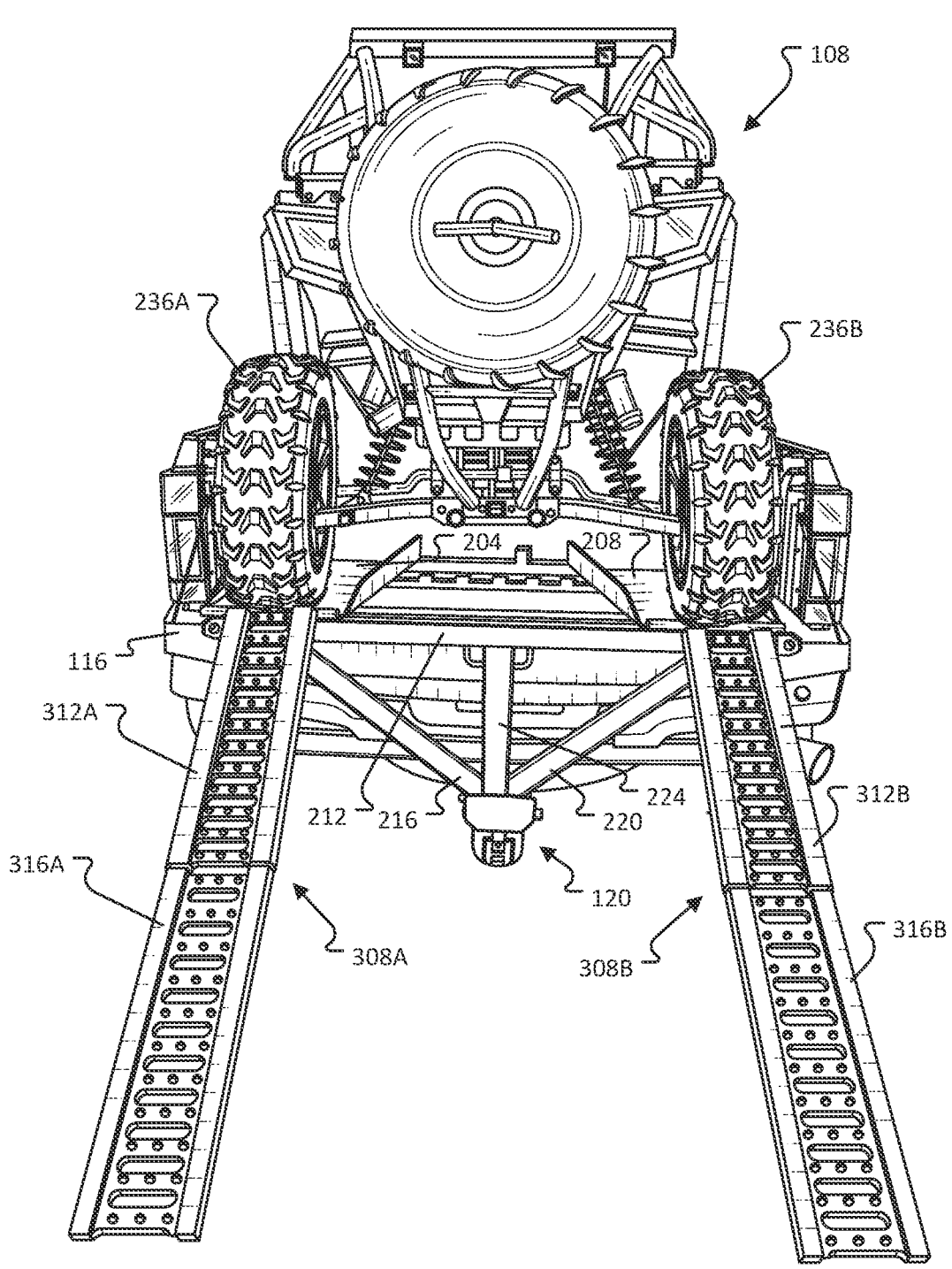
FIG. 3 includes an additional rear view of the system according to an embodiment of the present disclosure.

FIG. 3 depicts additional details of the rail assembly 112 together with one or more ramps coupled thereto in accordance with examples of the present disclosure. In addition to depicting the rail 204 and rail 208 to accommodate one or more wheels 236A and 236B of the ATV/UTV 108, FIG. 3 further depicts one or more ramp assemblies 308A and 308B. The one or more ramp assemblies 308 may include one or more ramp portions 312 and 316 (such as 312A and 316A and/or 312B and 316B) respectively. A ramp portion 316 may retract into the ramp portion 312; alternatively, or in addition, the ramp portion 316 may fold onto or fold back onto the ramp portion 312. Thus, the ramp assembly 308A, for instance, may fit in a cab of a truck or a vehicle 100. As further depicted in FIG. 3, the ramp portion 312A may be coupled to the rail 204 and likewise, the ramp portion 312B may be coupled to the rail portion 208, as the rail 204 and rail 208 reside on or otherwise are in contact with the cross-brace bar member 212 of the support assembly 120. Thus, weight of the ATV/UTV 108 may be transferred or otherwise carried by the cross-brace bar member 212 of the support assembly 120. Accordingly, the rail 204 and rail 208 may not necessarily contact the tailgate 116. That is, the rails 204 and 208 may distribute weight from the ATV/UTV 108 directly to, or at least partially to the cross-brace bar member 212 of the support assembly 120.

Figure 4:
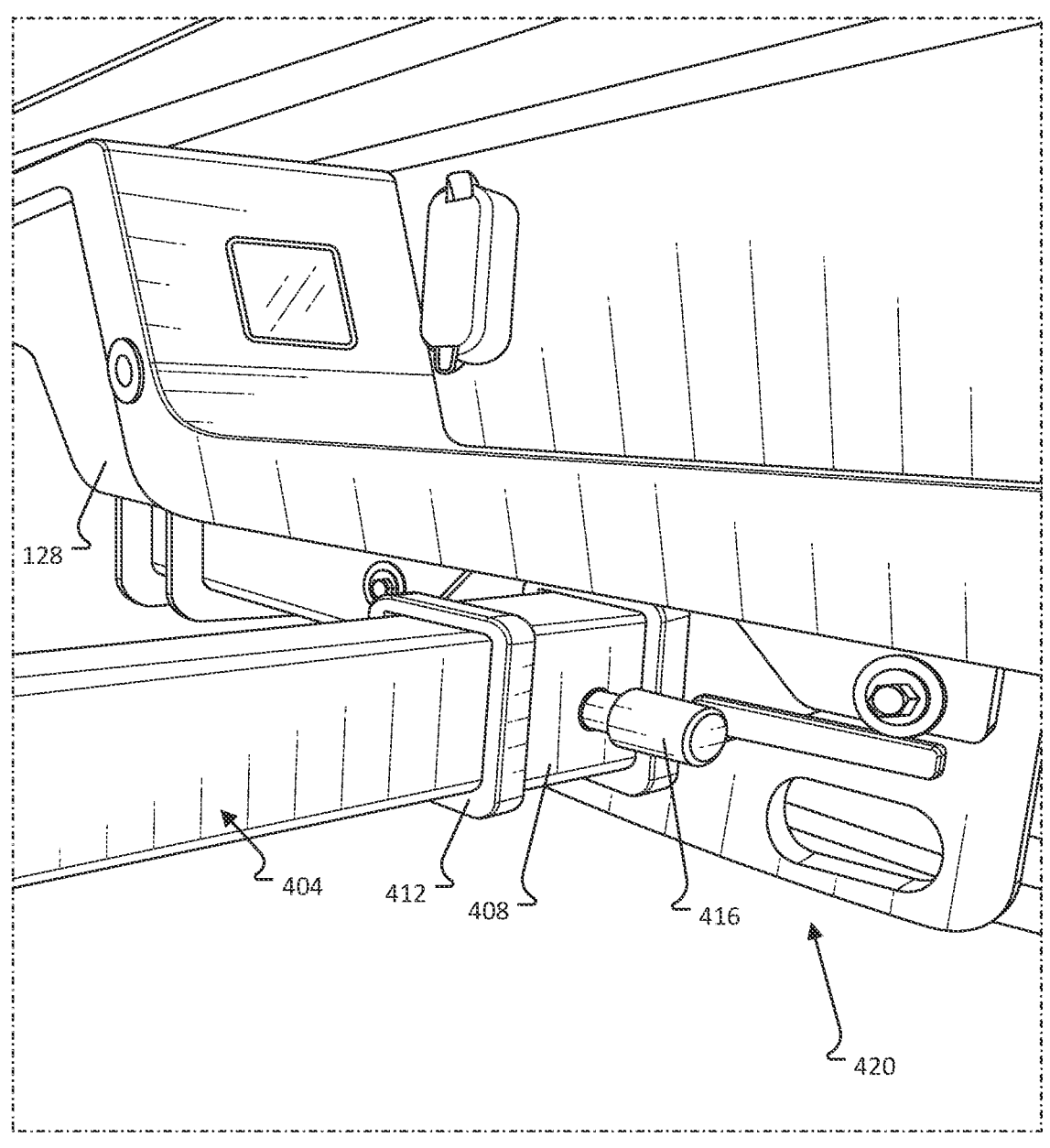
FIG. 4 includes an exploded view of the system according to an embodiment of the present disclosure.

FIG. 4 depicts additional details of the support assembly 120 in accordance with examples of the present disclosure. The support assembly 120 may include an extension support member 404, which may be configured to be received by the receiver tube 408 of a trailer hitch assembly 420. Accordingly, the extension support member 404 may be received at a receiver tube collar 412 of the receiver tube 408 and further secured use utilizing the securing pin 416. As further depicted in FIG. 4, the extension support member 404 may provide or otherwise be coupled to the receiver tube 408 below the bumper 128.

Figure 5:
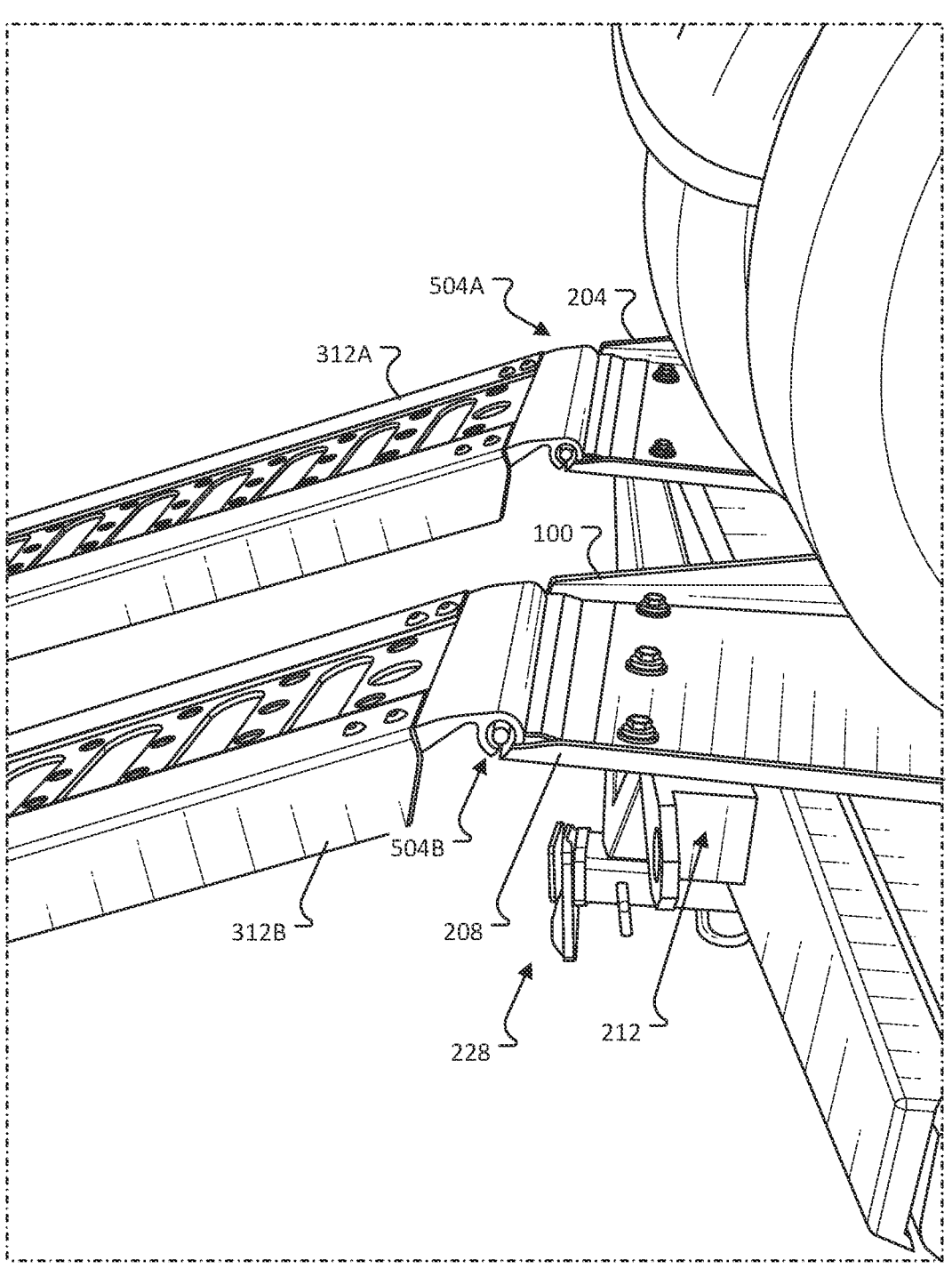
FIG. 5 includes an exploded side view of the system according to an embodiment of the present disclosure.

FIG. 5 depicts additional details of the ramp assembly 308 being coupled to or otherwise connected to a rail, such as rail 204 or rail 208. That is, one or more ramp portions 312A/312B may be coupled to respective rails 204 and 208. In examples, the ramp portion 312A may be coupled to, or otherwise attached to or in contact with the rail 204. Similarly, the ramp portion 312B may be coupled to or otherwise in contact with the rail 208. In accordance with the examples of the present disclosure, the ramp portions 312A/312B may pivot along a pivot axis provided by the rail 204 and/or rail 208. The ramp portion 312A, for example, may be coupled to the rail 204 utilizing a ramp and a rail coupling assembly 504A. The ramp portion 312B, for example, may be coupled to the rail 208 utilizing a ramp and a rail coupling assembly 504B. In examples of the present disclosure, the ramp portion 312 may pivot or otherwise move among an axis or pivot axis of the ramp and rail coupling assembly 504.

Figure 6:
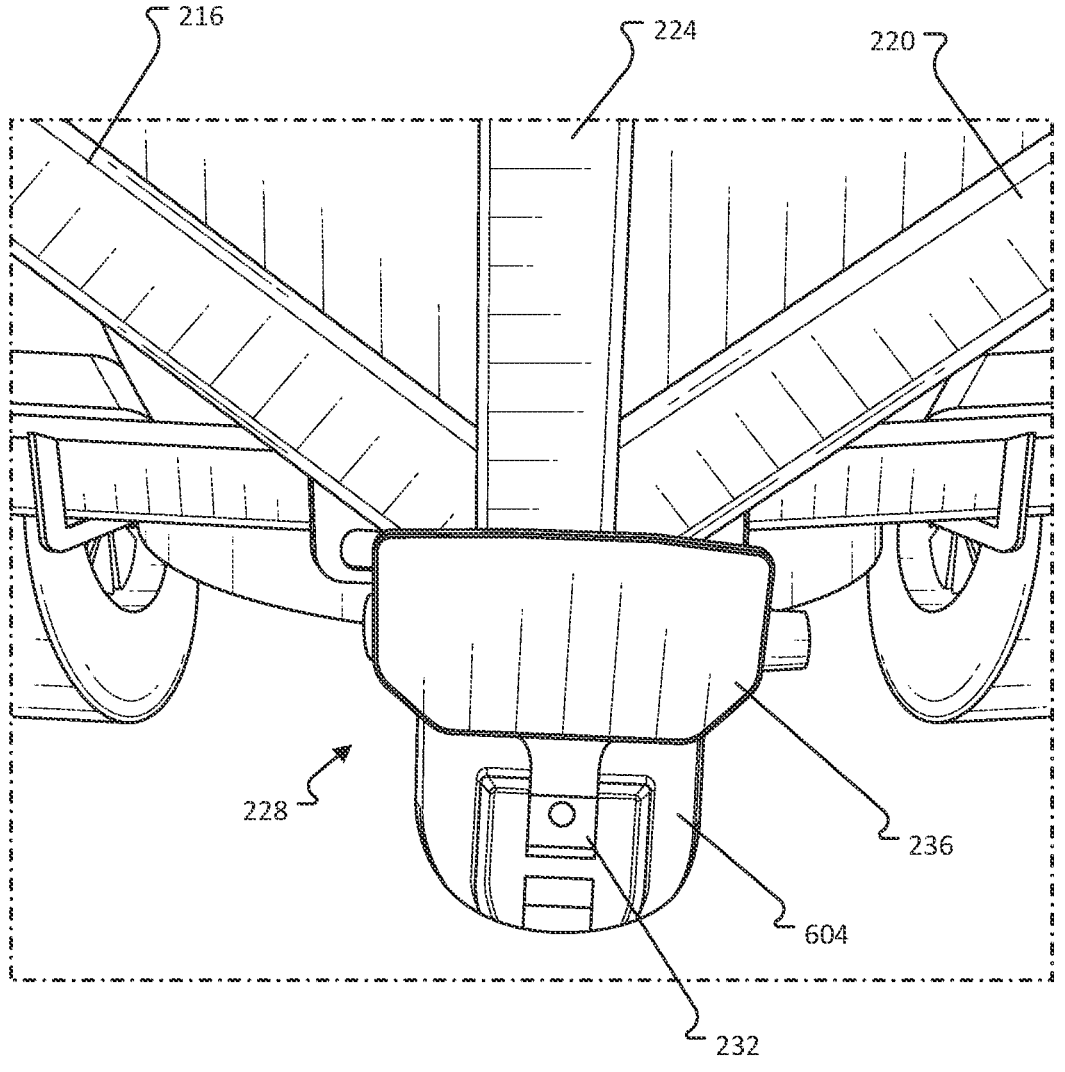
FIG. 6 includes an exploded rear view of the system according to an embodiment of the present disclosure.
Figure 7:
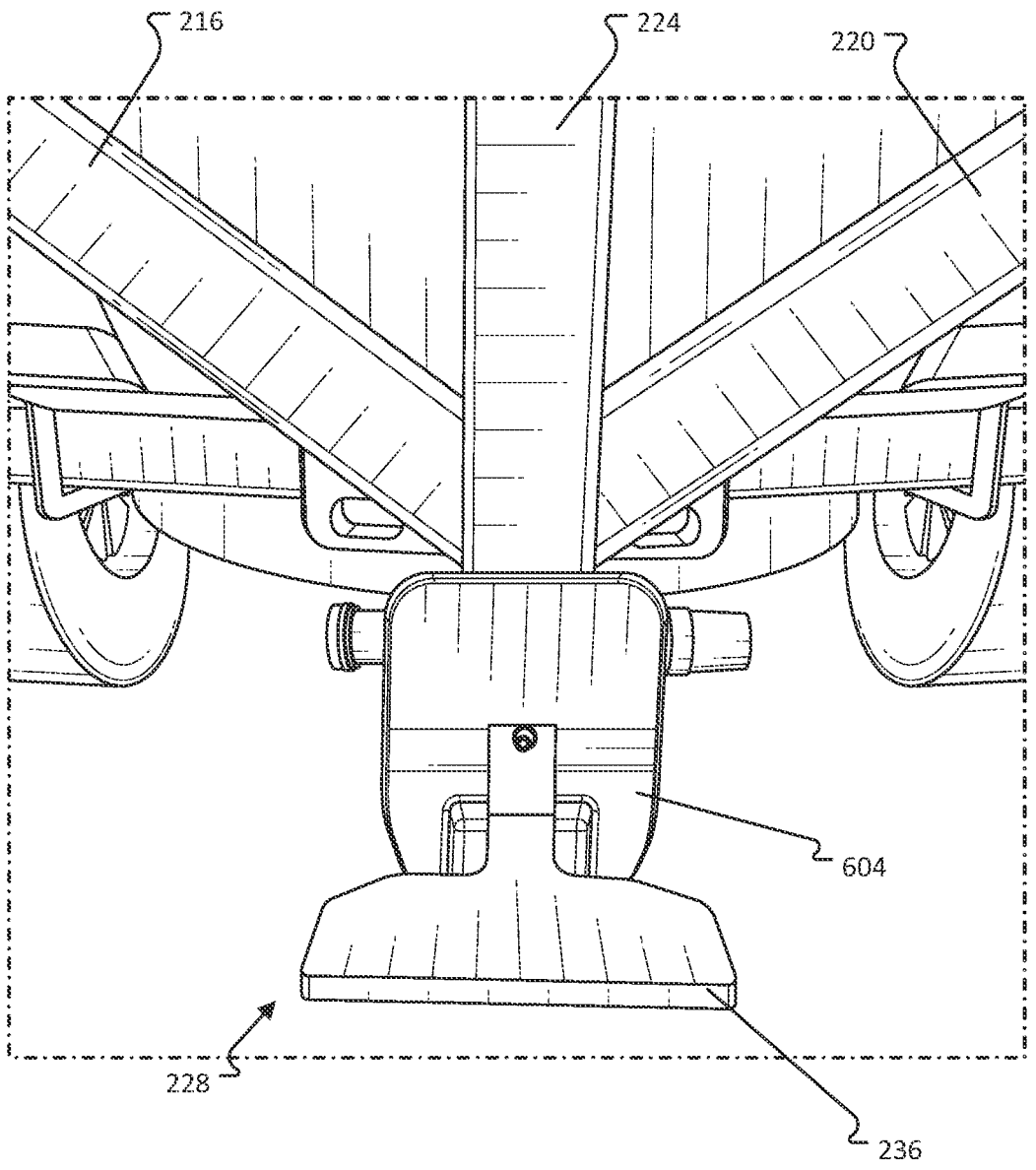
FIG. 7 includes an additional exploded rear view of the system according to an embodiment of the present disclosure.

FIG. 6 depicts additional details of the rail assembly 112 and the support assembly 120 together with the flip down step assembly 228 in accordance with examples of the present disclosure. The brace bar member 216, the center brace bar member 224, brace bar member 220 may be coupled to or otherwise in contact with the extension support member 404. In examples, the extension support member 404 may include a flip down step assembly receiver 604 coupled to a flip down step assembly 228. Accordingly, a step 236 may pivot along a flip down step pivot assembly 232. Thus, as depicted in FIG. 7, the step 236 may pivot along the flip down step pivot assembly 232 such that a portion of the flip down step 236 may be substantially parallel to a ground surface, thereby allowing a user or patron to step up to a greater height.

Figure 8:
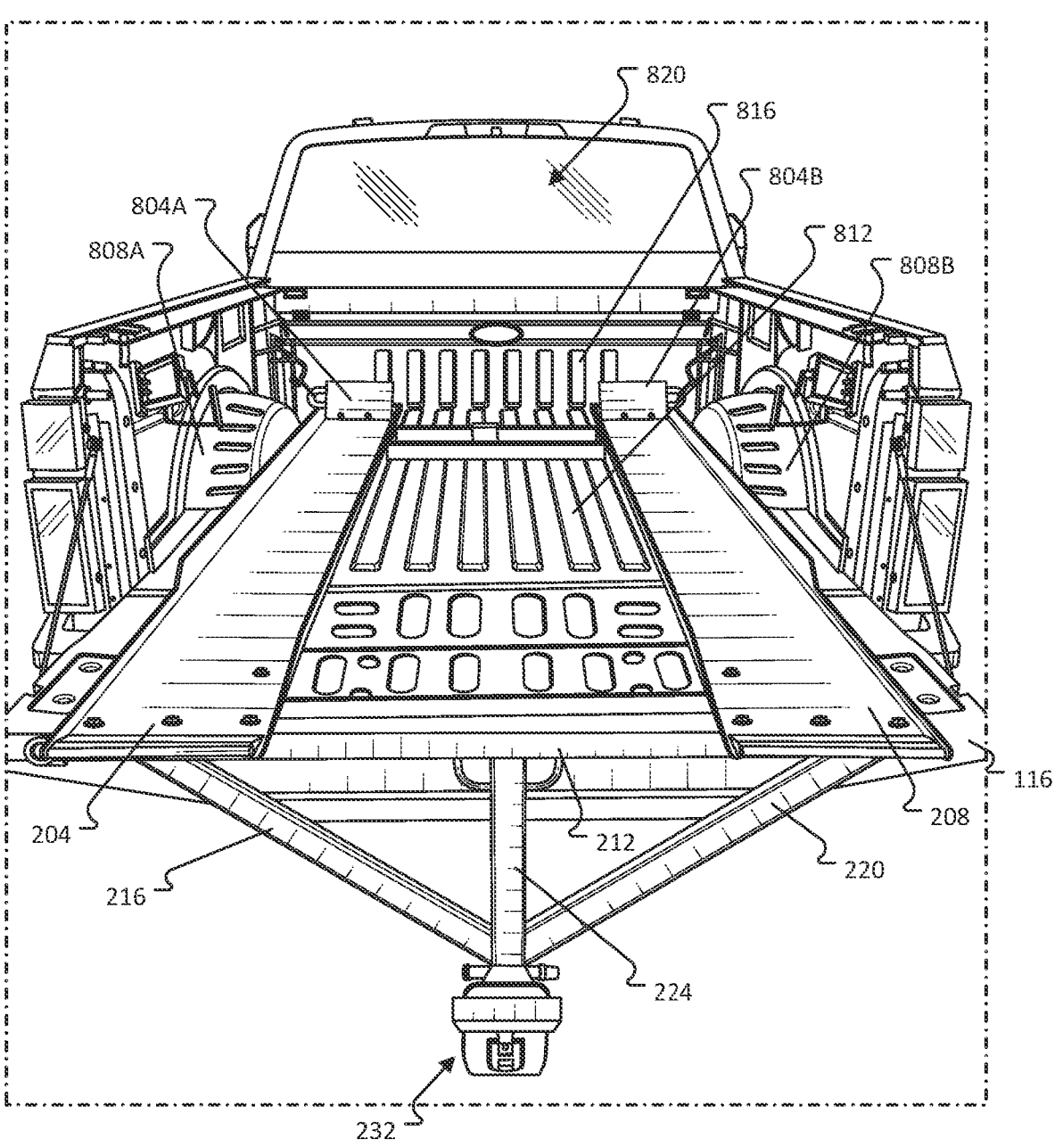
FIG. 8 is a perspective view of the system according to an embodiment of the present disclosure.

FIG. 8 depicts additional details of the rail assembly 112 together with the support assembly 120 as may configured in the pickup truck bed and/or cargo area of a vehicle 100. As previously discussed, the rail 204 and rail 208 may be attached to a surface 812 of a pickup truck bed. For example, and in accordance with the present disclosure, the rail 204 and the rail 208 may be supported by the cross-brace bar member 212, which in turn is supported by the brace bar member 216 of the rail support assembly 112, the center brace bar member 224 of the rail assembly 112, and the brace bar member 220 of the rail assembly 112. In accordance with examples of the present disclosure, the rail assembly 112 may be disposed between wheel housings 808A and 808B such that the rail assembly 112 may reside in the pickup truck bed or cargo area, or other storage area of the vehicle 100. Furthermore, each rail 204 and 208, respectively, may include a wheel stop 804A/804B. For example, the, wheel stop 804A and wheel stop 804B may be configured such that the ATV/UTV 108 may not rub or bump against a back portion of the cab 820 and/or the front truck bed panel 816.

Figure 9:
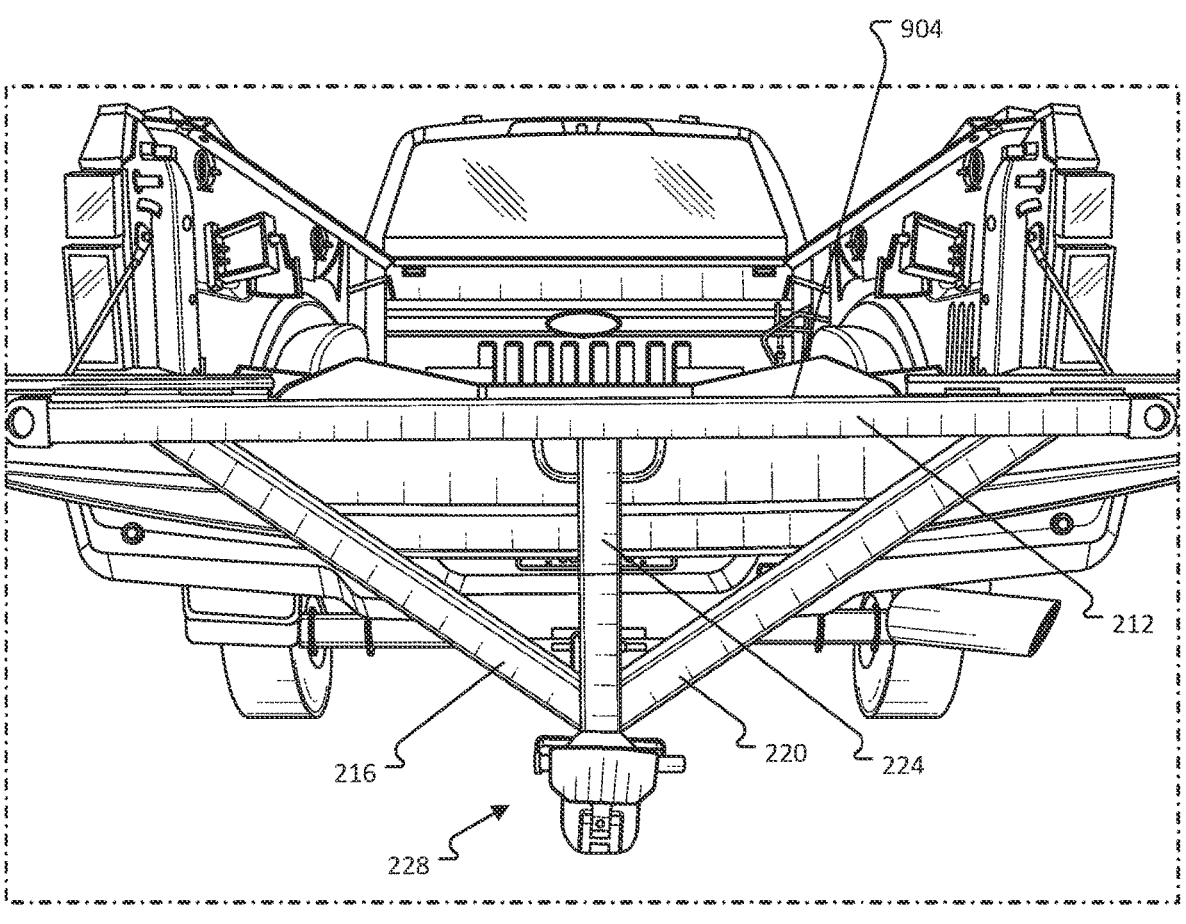
FIG. 9 is a perspective view of the system according to an embodiment of the present disclosure.

FIG. 9 depicts additional details of the rail assembly 112 in accordance with examples of the present disclosure. As previously discussed, the rail assembly 112 may include the flip down step assembly 228. Furthermore, the one or more rails 204 and/or 208 may be supported by the cross-brace bar member 212 of the support assembly 120. That is, the brace bar member 216, the brace bar member 220, and the center brace bar member 224, may be coupled to one another, or otherwise coupled to the extension support member 404. The flip down step assembly 228 may be optional and may be removably attached to the extension support member 404 as the rail 204 and rail 208 may be disposed upon a surface of the cross-brace bar member 212 of the support assembly 120. A material 904 may be disposed on an upper surface of the cross-brace bar member 212 of the support assembly 120 to absorb or dampen bumps, shock, etc that may be caused by the cross-brace bar member 212 intermittently contacting the rail 204 and/or rail 208.

Figure 10:
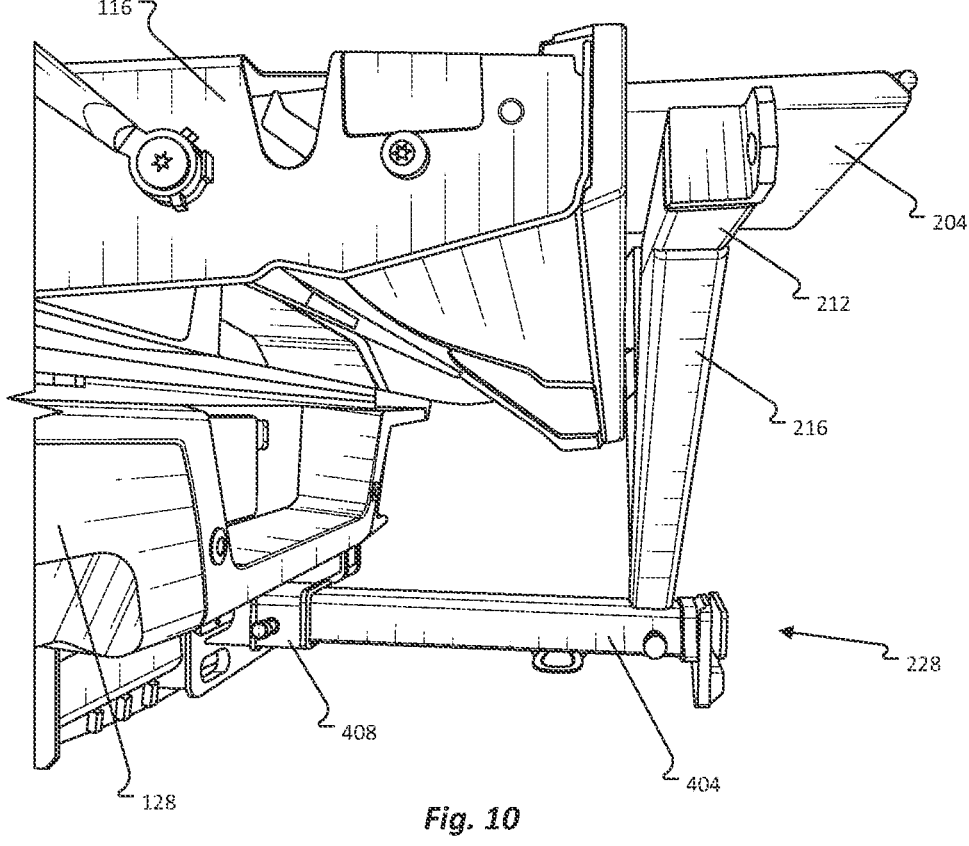
FIG. 10 is a side view of the system according to an embodiment of the present disclosure.

FIG. 10 depicts additional details of the crop, the support assembly 120 in accordance with examples of the present disclosure. As previously discussed, the support assembly 120 may include the extension support member 404 and the receiver tube 408. Accordingly, the extension support member 404 may be detachable from the receiver tube 408. Furthermore, the extension support member 404 may be of various lengths to accommodate differing lengths of the rail 204 and/or 208. The support assembly 120 supports the rail assembly 112 and may be detachable or otherwise removable from the receiver tube 408. In examples, the extension support member 404, may be couple to, or otherwise include the flip down step assembly 228.

Figure 11:
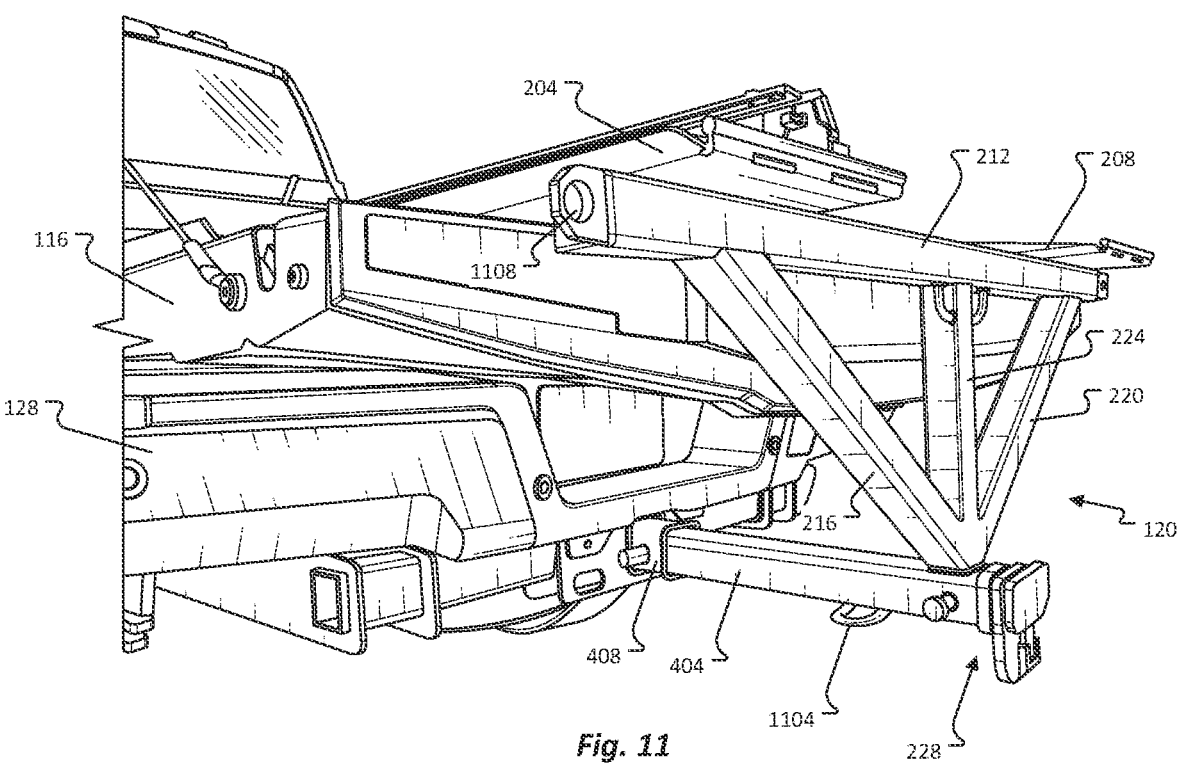
FIG. 11 is a perspective view of the system according to an embodiment of the present disclosure.

FIG. 11 depicts additional details of the support assembly 120 in accordance with examples of the present disclosure. The support assembly 120 may include the cross-brace bar member 212, the brace bar member 216, the brace bar member 220, and the center brace bar member 224. Alternatively, or in addition, other supporting structures may support the rail assembly 112 (e.g., rail 204 and rail 208). For example, the support assembly 120 may include more or fewer brace bar members. Further, a cross-brace bar member 212 may be divided into one or more lengths. As previously discussed, the support assembly 120 may be removable or otherwise detachable from the receiver tube 408. In examples, one or more tie down loops 1104 may allow an individual to fasten or otherwise secure an ATV/UTV 108 that may be being transported in the back of the vehicle 100. In examples, the extension support member 404 may include a receiver for receiving a ball mount such that a trailer can be towed behind the vehicle 100. Furthermore, portions of the cross-brace bar support member 212 may include one or more holes or through holes 1108, which may allow a user to tie down or otherwise secure an ATV/UTV 108 that may be in the pickup truck bed.

The support assembly 120, including one or more of the cross-brace bar member 212, the brace bar member 216, the brace bar member 220, and the center brace bar member 224 may be constructed of a tubular aluminum or other materials including other metals and/or thermoplastics. Similarly, the extension support member 404 may be constructed of a tubular aluminum or other materials including other metals and/or thermoplastics. The rails 204 and 208, and the ramp assemblies 308A/308B, may be constructed of aluminum, steel, or other materials including other metals and/or thermoplastics. The flip down step assembly 228 may be constructed of aluminum, steel, or other materials including other metals and/or thermoplastics.

Figure 12:
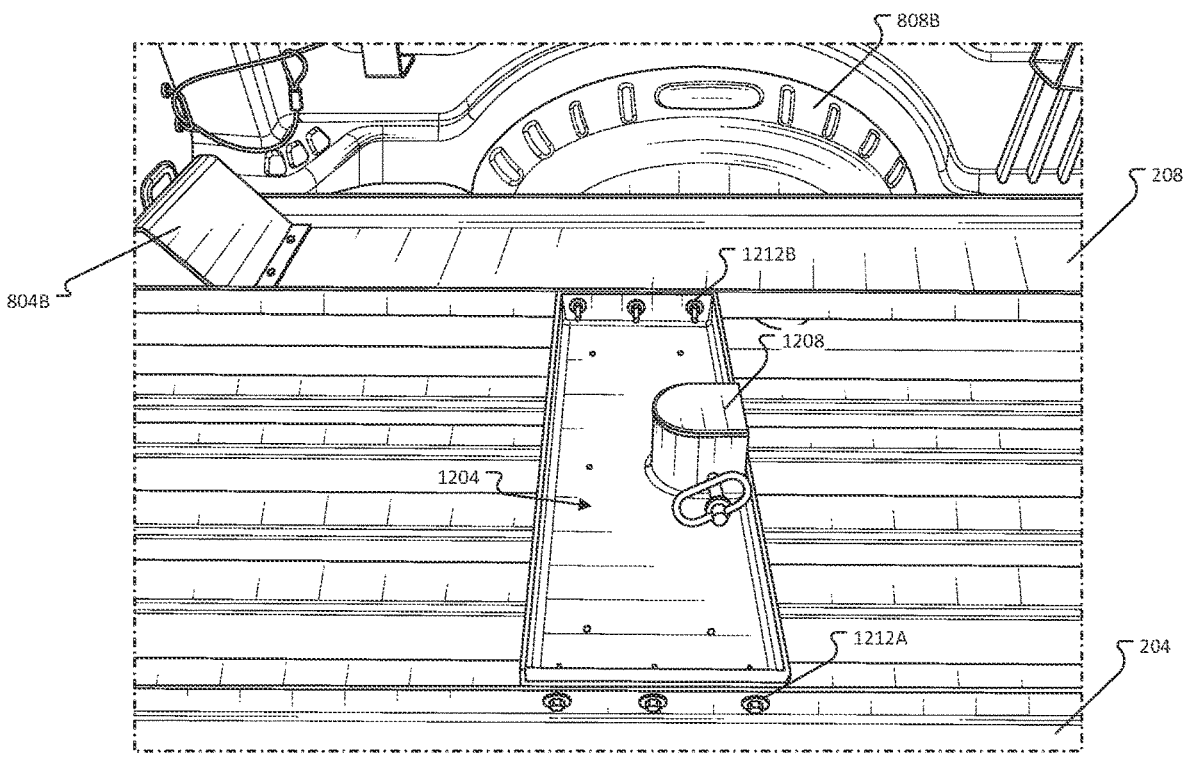
FIG. 12 is a top view of the system according to an embodiment of the present disclosure.

FIG. 12 depicts additional details of the rail assembly 112 in accordance with examples of the present disclosure. One or more rails 204 and/or 208 may include a wheel stop 804B as previously disclosed. In examples, a center portion 1204 may reside or otherwise be disposed between the rail 204 and rail 208 in accordance with examples of the present disclosure. The center portion 1204 may secure the rail 204 and rail 208 utilizing one or more fastening means 1212A and/or 1212B. A fastening means may include a screw, bolt, nut, etc. The center portion 1204 may provide the option for a fifth wheel connection assembly, such as a fifth wheel connection 1208. The wheel stop 804 and/or the center portion 1204 may be constructed of aluminum, steel, or other materials including other metals and/or thermoplastics.

Figure 13:
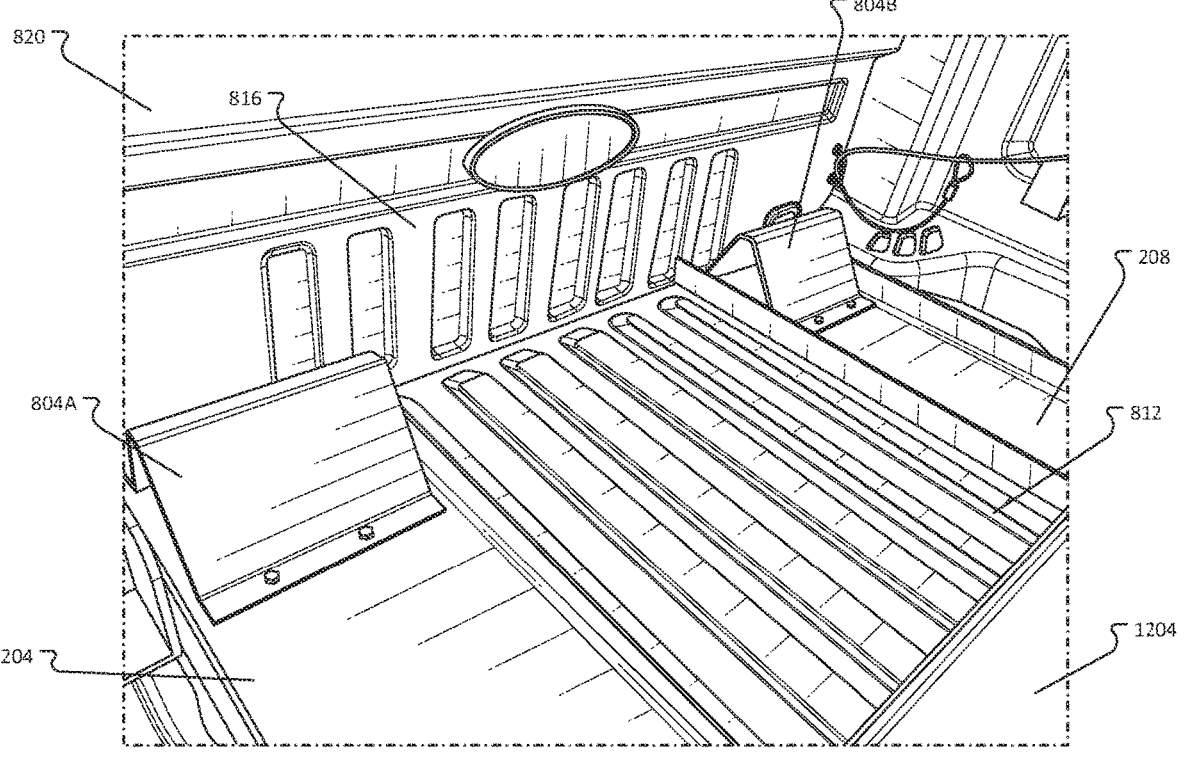
FIG. 13 is a top view of the system according to an embodiment of the present disclosure.

FIG. 13 provides additional details of the pickup truck bed 104, belonging to the vehicle 100 in accordance with examples of the present disclosure. As previously discussed, each rail 204 and/or 208 may include one or more wheel stops 804A and 804B respectively. The wheel stops 804 may prevent or otherwise minimize the chance that an ATV/UTV 108 located in the pickup bed of a vehicle 100 from making contact with or otherwise bumping a truck front truck panel portion 816 and/or a cab portion 820.

Figure 14:
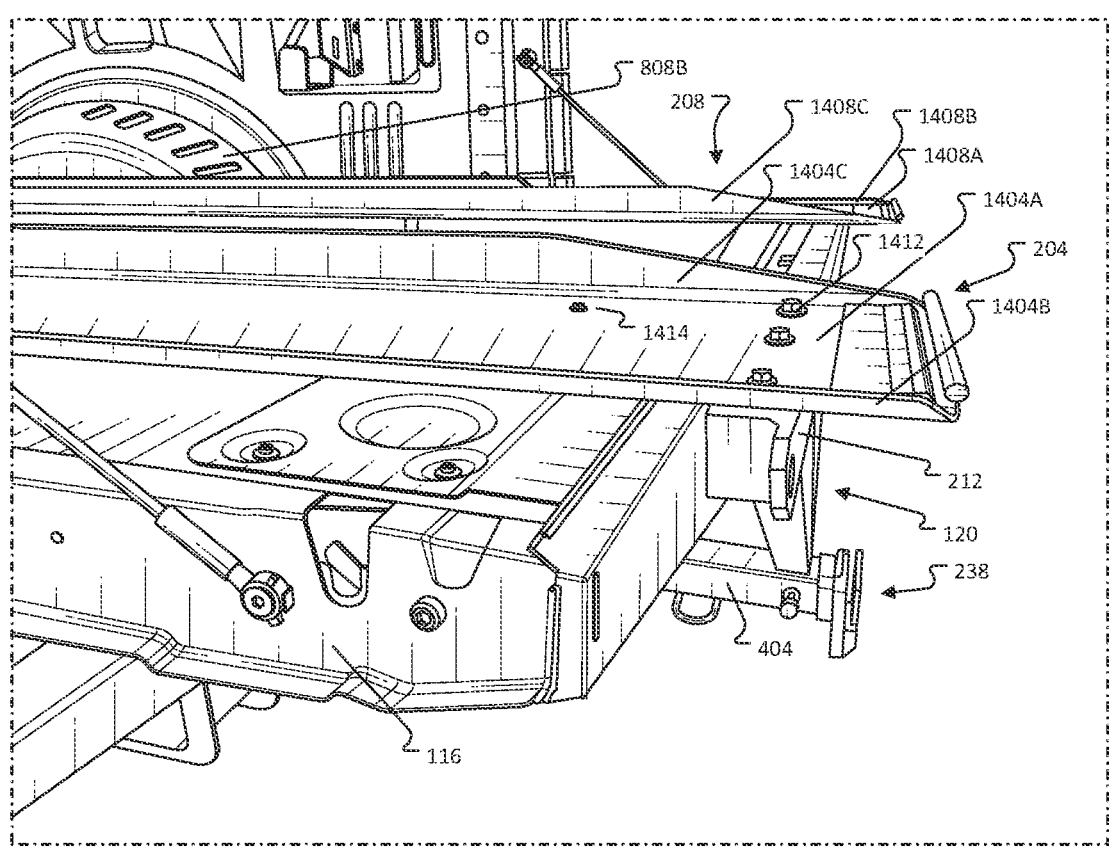
FIG. 14 is a perspective view of the system according to an embodiment of the present disclosure.

FIG. 14 describes or otherwise depicts additional details of the rail assembly 112 in accordance with examples of the present disclosure. In examples, a rail such as the rail 204 may include a tread portion, 1404A and one are more side portions 1404B and 1404C. Each of the rails 204 and 208 may be secured to the cross-brace bar member 212 of the support assembly 120 utilizing one or more fastening means 1412. Furthermore, one or more fasteners, such as the fastener 1414, may secure the rail 204 to the tailgate 116.

Figure 15:
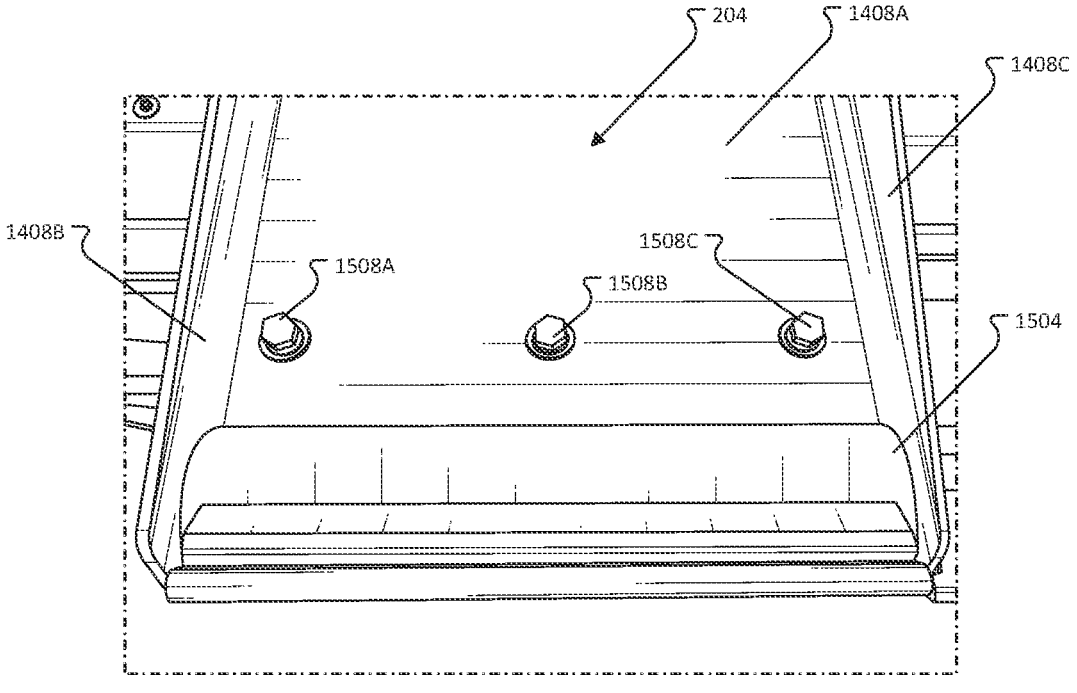
FIG. 15 includes an exploded top view of the system according to an embodiment of the present disclosure.

FIG. 15 depicts additional details of a rail, such as a rail 204 in accordance of examples of the present disclosure. As previously, the rail such as the rail 204 may include a tread portion, 1408A and one or more side portions 1408B and 1408C. Further, and as previously discussed, the rail 204, for example, may include a ramp and rail coupling assembly 504, allowing a ramp such as a ramp portion 312 to be temporarily coupled to or otherwise connected to the rail 204. Further, FIG. 15 depicts one or more fasteners 1508A through 1508B, which may secure a rail such as a rail 204 to the cross-brace bar member 212 of the support assembly 120.

Figure 16:
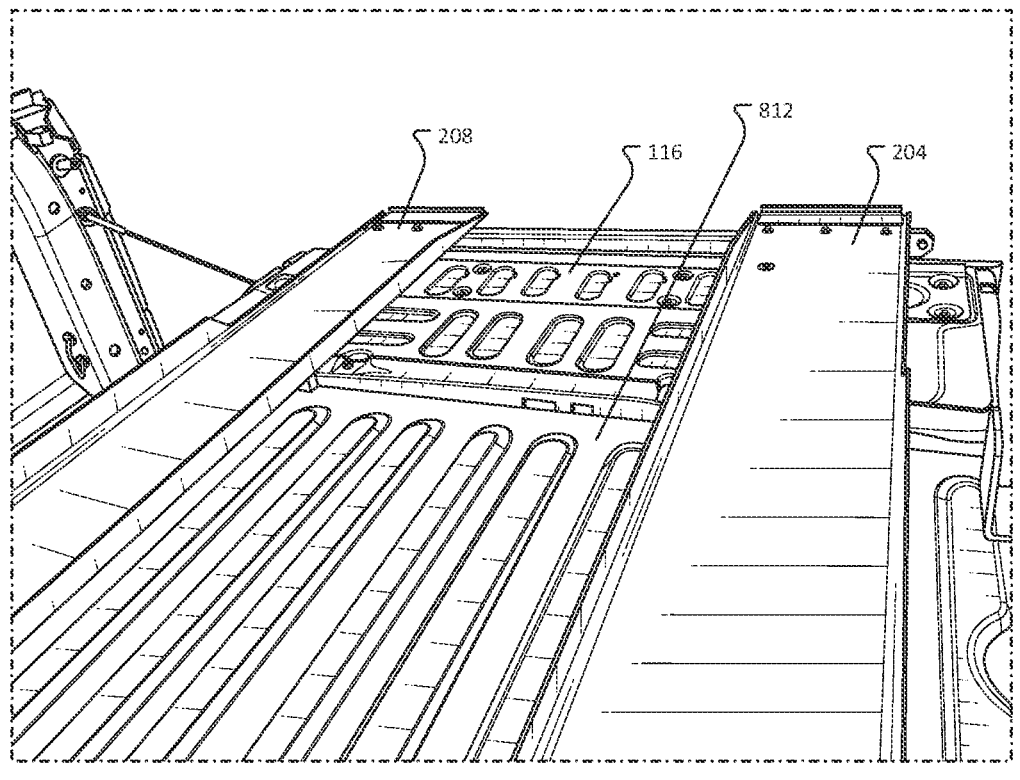
FIG. 16 includes a top view of the system according to an embodiment of the present disclosure.

FIG. 16 further depicts additional details of the rail assembly 112 in accordance with example of the present disclosure. The rail 204 and rail 208 may extended over the tailgate 116 and be secured to the cross-brace bar member 212.

Figure 17:
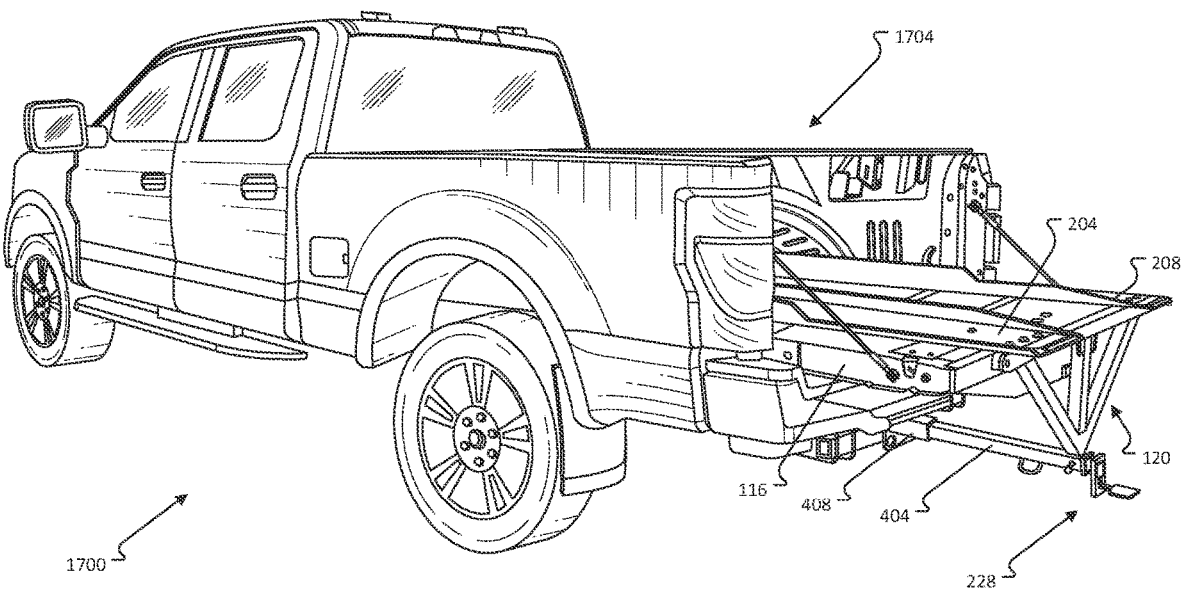
FIG. 17 is a perspective view of the system according to an embodiment of the present disclosure.

FIG. 17 depicts additional details of a vehicle 1700 in accordance with examples of the press disclosure. The vehicle 1700 may include a long bed or short bed and may accommodate the rail assembly 112 and/or the support assembly 120. In accordance with examples of the present disclosure, and as depicted in FIG. 17, the rail 204 and rail 208 may be supported by the cross-brace bar member 212. Furthermore, the flip down step assembly 228 may include the step portion or step 236.

Figure 18:
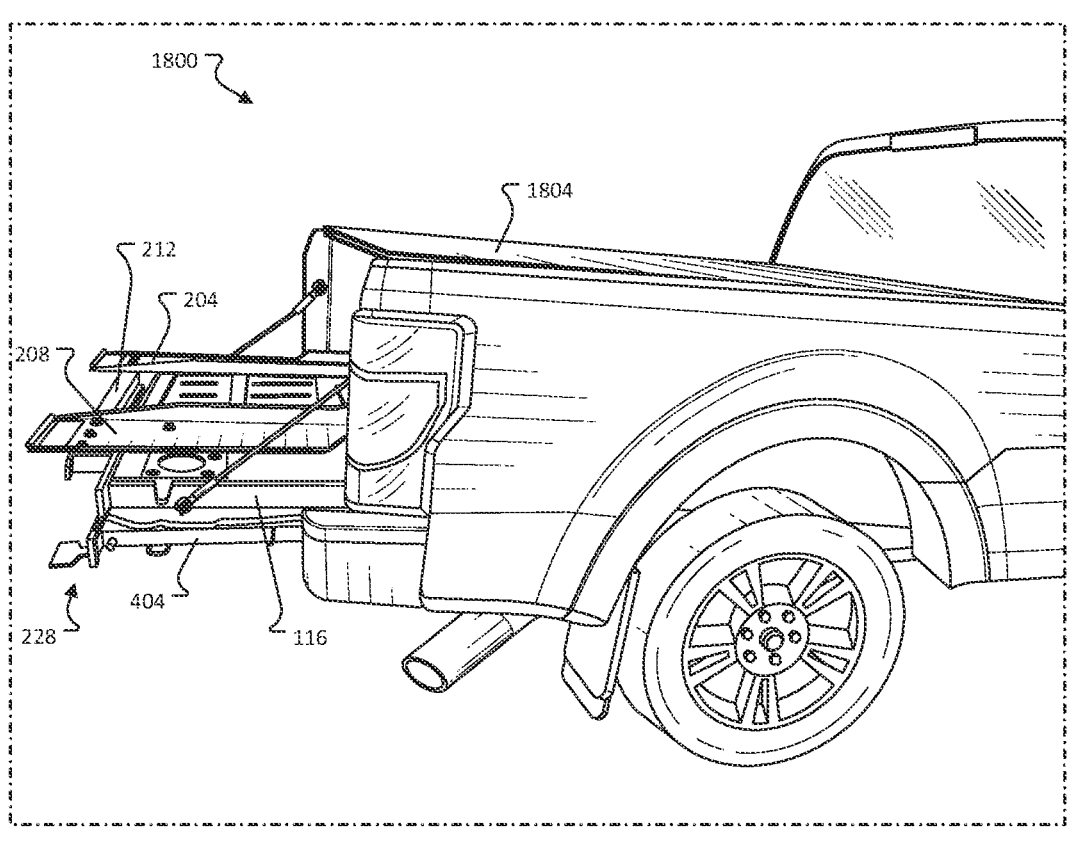
FIG. 18 is a side view of the system according to an embodiment of the present disclosure.

FIG. 18 depicts additional details of the rail assembly 112 in accordance with examples of the present disclosure. The rail 204 and rail 208 may be coupled to or otherwise fastened to the cross-brace bar member 212. In accordance with examples of the present disclosure, an extension support member 404 may be coupled to the cross-brace bar member 212 via the brace bar members 216, 220, and the center brace bar member 224. In accordance with examples of the present disclosure, the rail assembly 112 may be secured to the cross-brace bar member 212. In examples, a vehicle 1800 may include a cover 1804 that covers the back of the cargo portion or pickup truck bed of the vehicle 1800.

Figure 19A:
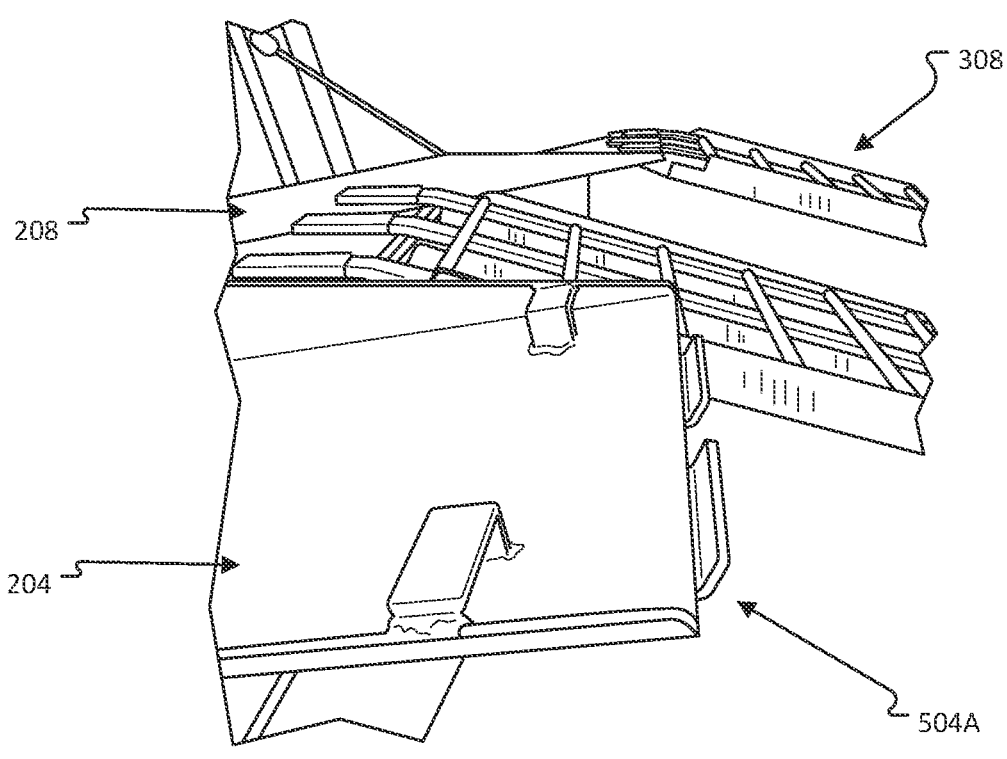
FIGS. 19A-19B include an exploded side view of the system according to an embodiment of the present disclosure.
Figure 19B:
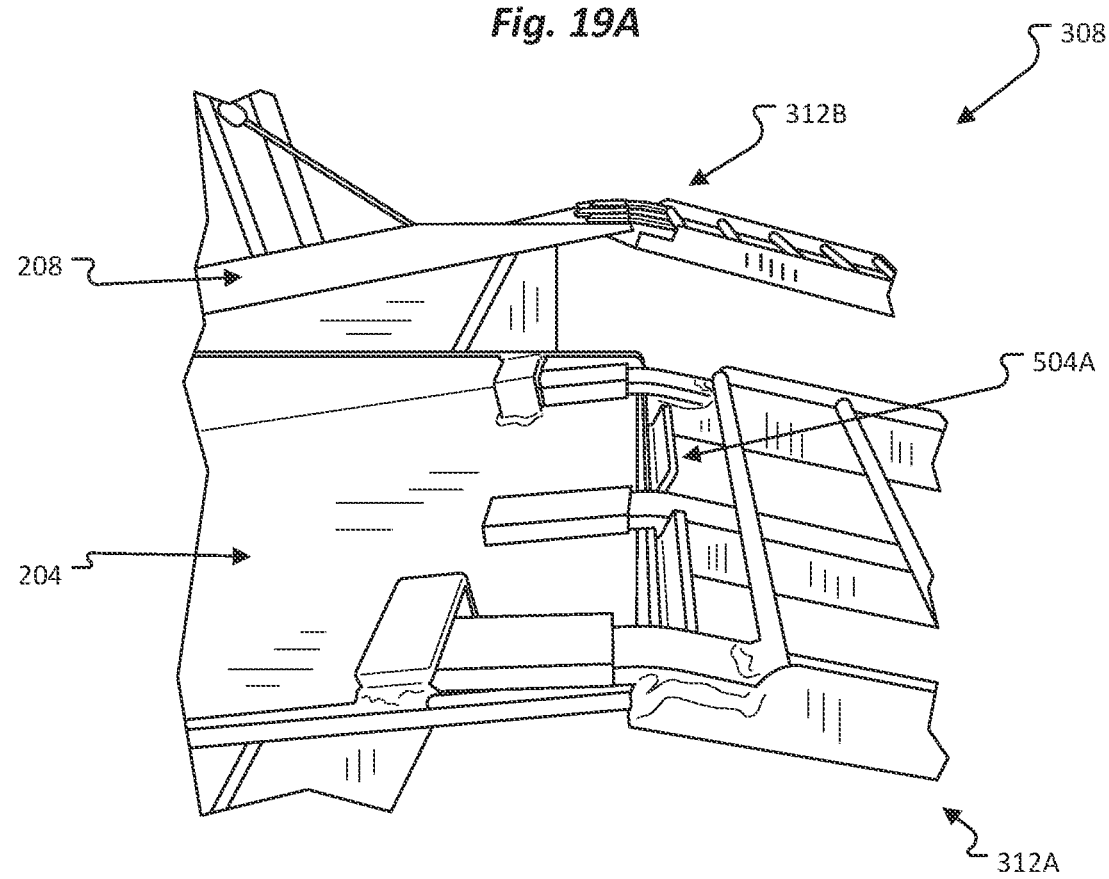

FIGS. 19A-B depict additional details of the ramp assembly 308 being coupled to or otherwise connected to a rail, such as rail 204 or rail 208. That is, one or more ramp portions 312A/312B may be coupled to respective rails 204 and 208. In examples, the ramp portion 312A may be coupled to, or otherwise attached to or in contact with the rail 204. Similarly, the ramp portion 312B may be coupled to or otherwise in contact with the rail 208. In accordance with the examples of the present disclosure, the ramp portions 312A/312B may pivot along a pivot axis provided by the rail 204 and/or rail 208.

The ramp portion 312A, for example, may be coupled to the rail 204 utilizing a ramp and a rail coupling assembly 504A. The ramp portion 312B, for example, may be coupled to the rail 208 utilizing a ramp and a rail coupling assembly 504B. In examples of the present disclosure, the ramp portion 312 may pivot or otherwise move among an axis or pivot axis of the ramp and rail coupling assembly 504.

Figure 19C:
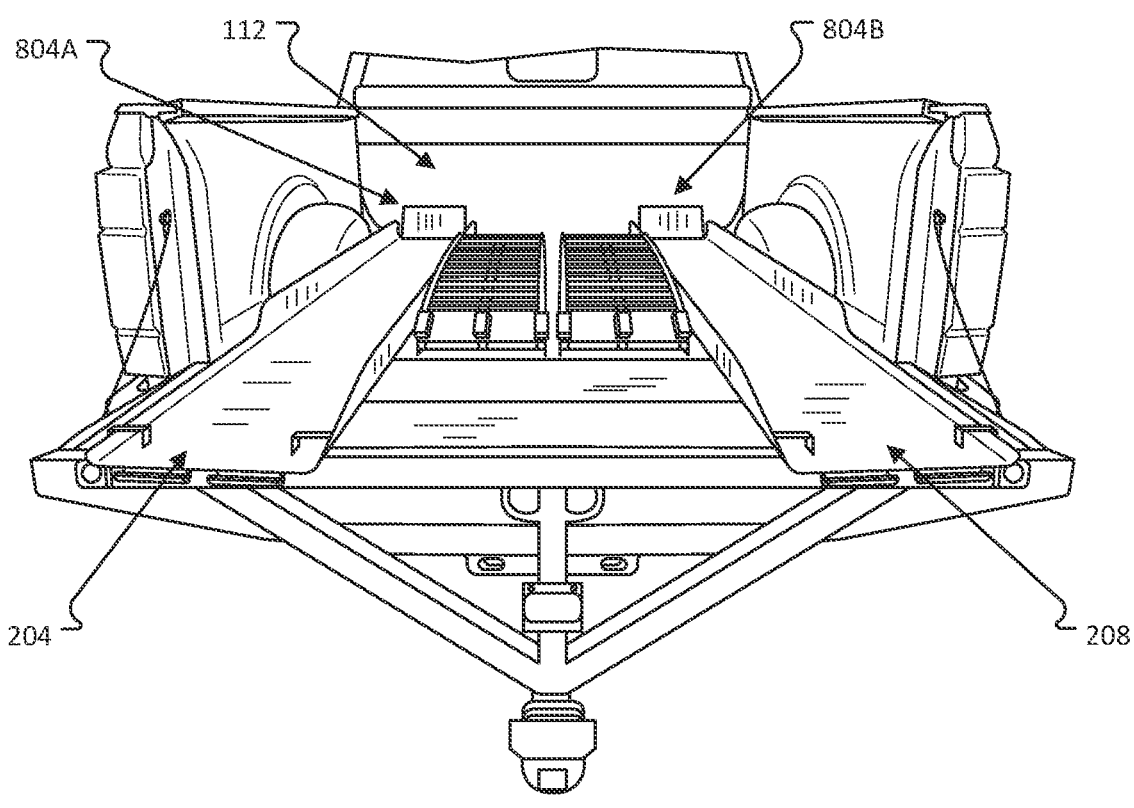
FIG. 19C includes a rear view of the system according to an embodiment of the present disclosure.
Figure 19D:
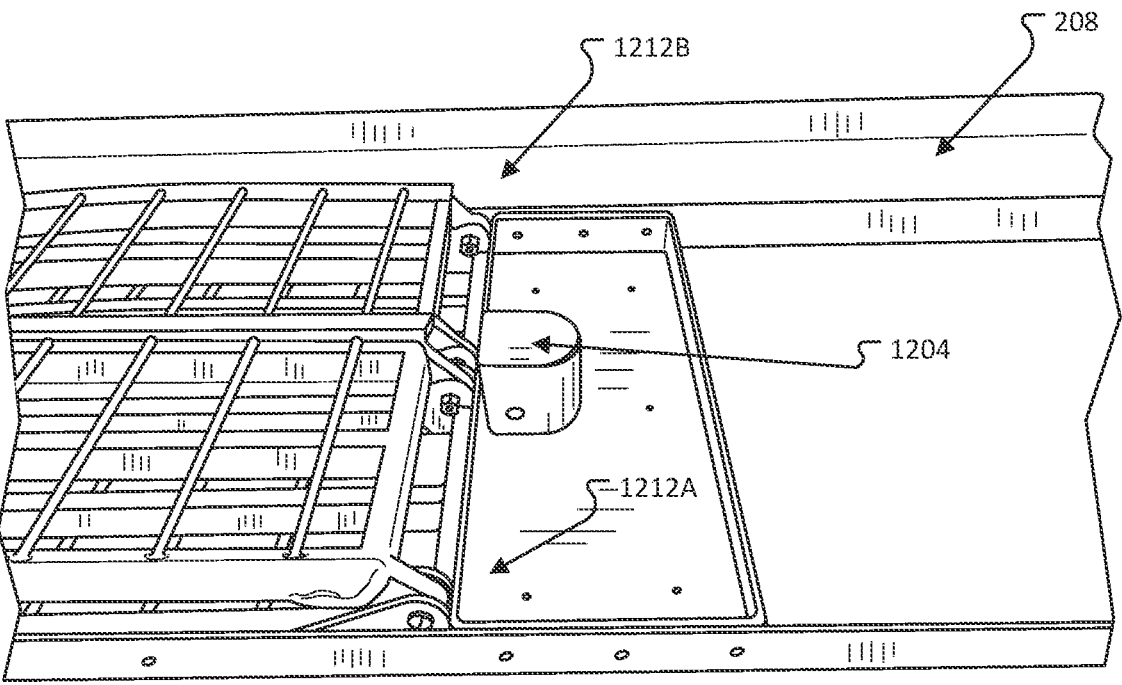
FIG. 19D includes a perspective view of the system according to an embodiment of the present disclosure.

FIGS. 19C-D depict additional details of the rail assembly 112 in accordance with examples of the present disclosure. One or more rails 204 and/or 208 may include a wheel stop 804A and/or 804B as previously disclosed. In examples, a center portion 1204 may reside or otherwise be disposed between the rail 204 and rail 208 in accordance with examples of the present disclosure. The center portion 1204 may secure the rail 204 and rail 208 utilizing one or more fastening means 1212A and/or 1212B. A fastening means may include a screw, bolt, nut, etc. The center portion 1204 may provide the option for a fifth wheel connection assembly, such as a fifth wheel connection 1208. The wheel stop 804 and/or the center portion 1204 may be constructed of aluminum, steel, or other materials including other metals and/or thermoplastics.

FIGS. 20A and 20B depict additional details of the ramp assembly 308 being coupled to or otherwise connected to directly to the tailgate 116 of the vehicle.

Figures 20C, 20D:
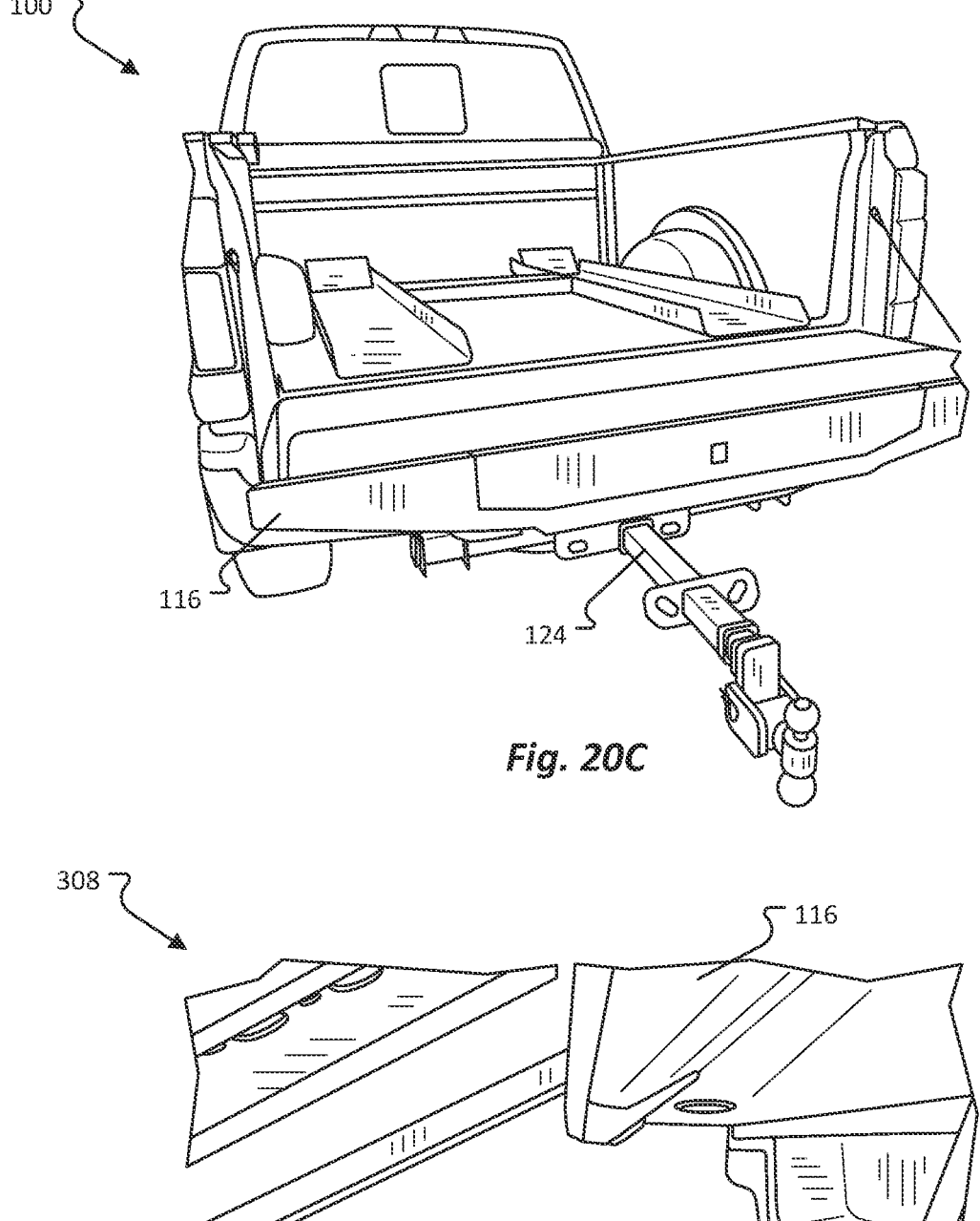
FIG. 20C is a perspective rear view of the system according to an embodiment of the present disclosure.
FIG. 20D includes an exploded side view of the system according to an embodiment of the present disclosure.
Figures 20E, 20F:
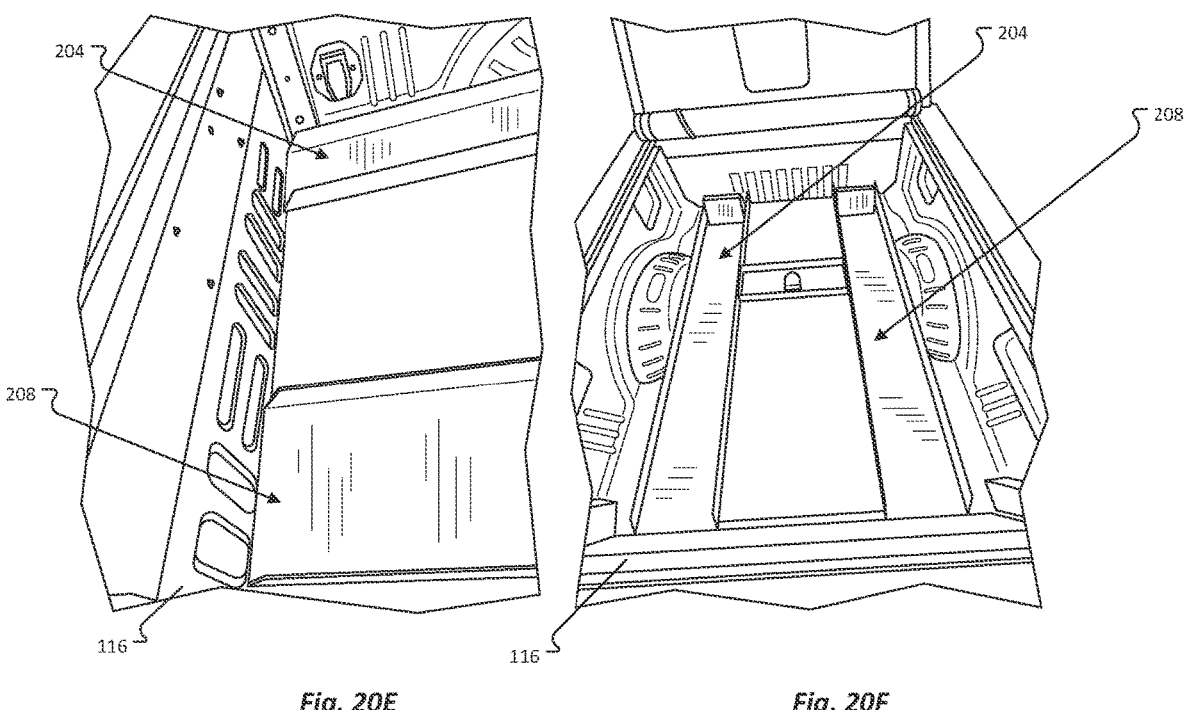
FIG. 20E includes an exploded top view of the system according to an embodiment of the present disclosure.
FIG. 20F is a top view of the system according to an embodiment of the present disclosure.

FIGS. 20C and 20D depict additional details of the support assembly, which may include an extension support member 124 configured to be coupled to or otherwise received at a towing hitch assembly of the vehicle 100. In this embodiment, the support assembly omits the cross-brace bar member 212, the brace bar member 216, the brace bar member 220, and the center brace bar member 224. In FIGS. 20C and 20D, the ramp assembly 308 being coupled to or otherwise connected to directly to the tailgate 116 of the vehicle as depicted in FIGS. 20A and 20B permit the tailgate 116 to close without removing the rail 204 and/or rail 208.

Specific details were given in the description to provide a thorough understanding of the embodiments. However, it will be understood by one of ordinary skill in the art that the embodiments may be practiced without these specific details. While illustrative embodiments of the disclosure have been described in detail herein, it is to be understood that the inventive concepts may be otherwise variously embodied and employed, and any appended claims are intended to be construed to include such variations, except as limited by the prior art.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A rail and support assembly for securing a utility vehicle to a bed of a pickup truck, the rail and support assembly including:
   a plurality of rails secured to the bed of the pickup truck and configured to accommodate a plurality of wheels of the utility vehicle, wherein each rail is configured to be coupled to a ramp portion;
   a support assembly coupled to the plurality of rails, the support assembly including a plurality of brace bar members coupled to a cross-brace bar and an extension receiver member, the extension receiver member configured to be received by a receiver tube of a trailer hitch assembly coupled to the pickup truck; and
   a central portion removably attached to the bed of the pickup truck, wherein the central portion is disposed between and coupled to each rail of the plurality of rails, and wherein the central portion includes a fifth wheel connection assembly.

2. The rail and support assembly of claim 1, wherein at least one brace bar member of the plurality of brace bar members is perpendicular to the cross-brace bar and the extension receiver member.

3. The rail and support assembly of claim 2, wherein the cross-brace bar is coupled directly to the plurality of rails.

4. The rail and support assembly of claim 1, further comprising at least one wheel stop coupled to at least one rail of the plurality of rails such that the at least one wheel stop is between a wheel of the plurality of wheels of the utility vehicle and a cab of the pickup truck.

5. The rail and support assembly of claim 1, further comprising a flip down assembly coupled to the extension receiver member, the flip down assembly including a step pivotably attached to the extension support member.

6. The rail and support assembly of claim 1, wherein the ramp portion corresponding to a respective rail extends from the respective rail to a surface on which the pickup truck is positioned.

7. The rail and support assembly of claim 1, wherein each rail of the plurality of rails is removably attached to a tailgate of the pickup truck.

8. The rail and support assembly of claim 1, wherein each ramp portion of the plurality of ramp portions is coupled to a tailgate of the pickup truck via a coupling assembly.

9. The rail and support assembly of claim 8, wherein each ramp portion corresponding to a respective rail is configured to pivot along a pivot axis of the coupling assembly.

10. An assembly for securing a utility vehicle to a bed of a pickup truck, the assembly including:

a plurality of rails secured to the bed of the pickup truck and configured to accommodate the utility vehicle;

a plurality of ramp portions, each ramp portion of the plurality of ramp portions corresponding to a respective rail, wherein a first end of each ramp portion of the plurality of ramp portions is removably secured to a coupling assembly and a second end of each ramp portion of the plurality or ramp portions is configured to contact a surface on which the pickup truck is positioned;

a central portion removably attached to the bed of the pickup truck, wherein the central portion is coupled to each rail of the plurality of rails and;

wherein the coupling assembly is removably attached to a tailgate of the pickup truck.

11. The assembly of claim 10, further comprising at least one wheel stop coupled to at least one rail of the plurality of rails such that the at least one wheel stop is between a wheel of the utility vehicle and a cab of the pickup truck.

12. The assembly of claim 10, wherein the ramp portion corresponding to a respective rail is configured to pivot along a pivot axis provided by the respective rail.

13. The assembly of claim 10, further comprising a support assembly coupled to the plurality of rails, the support assembly including a plurality of brace bar members coupled to a cross-brace bar and an extension receiver member, the extension receiver member configured to be received by a receiver tube of a trailer hitch assembly coupled to the pickup truck.

14. A rail assembly for securing a utility vehicle to a bed of a pickup truck, the rail assembly including:

a plurality of rails secured to the bed of the pickup truck and configured to accommodate the utility vehicle; and a plurality of ramp portions, each ramp portion of the plurality of ramp portions corresponding to a respective rail, wherein a first end of each ramp portion of the plurality of ramp portions is configured to make contact with a coupling assembly of a respective rail or a coupling assembly that is removably attached to a tailgate of the pickup truck, and wherein a second end of each ramp portion of the plurality or ramp portions is configured to contact a surface on which the pickup truck is positioned.

15. The rail assembly of claim 14, further comprising a central portion removably attached to the bed of the pickup truck, wherein the central portion is coupled to each rail of the plurality of rails.

16. The assembly of claim 14, further comprising at least one wheel stop coupled to at least one rail of the plurality of rails.

17. The rail assembly of claim 14, wherein the ramp portion corresponding to a respective rail is configured to pivot along a pivot axis provided by the coupling assembly.

* * * * *